(12) United States Patent
Sato

(10) Patent No.: US 10,477,071 B2
(45) Date of Patent: Nov. 12, 2019

(54) IMAGE PROCESSING APPARATUS AND IMAGE PROCESSING METHOD IN WHICH COLOR AND MONOCHROME IMAGES ARE DISTINGUISHED

(71) Applicant: CANON KABUSHIKI KAISHA, Tokyo (JP)

(72) Inventor: Hideo Sato, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/937,730

(22) Filed: Mar. 27, 2018

(65) Prior Publication Data

US 2018/0220045 A1    Aug. 2, 2018

Related U.S. Application Data

(62) Division of application No. 14/731,336, filed on Jun. 4, 2015, now Pat. No. 9,961,235.

(30) Foreign Application Priority Data

Jun. 11, 2014   (JP) ................................. 2014-120786

(51) Int. Cl.
*G06K 9/46*     (2006.01)
*H04N 1/46*     (2006.01)
*G06K 9/34*     (2006.01)
*G06T 7/90*     (2017.01)

(52) U.S. Cl.
CPC ................. *H04N 1/46* (2013.01); *G06K 9/34* (2013.01); *G06K 9/4642* (2013.01); *G06K 9/4652* (2013.01); *G06T 7/90* (2017.01); *G06K 2209/01* (2013.01)

(58) Field of Classification Search
CPC ... H04N 1/56; H04N 1/60; G06T 7/90; G06K 9/34; G06K 9/4642; G06K 9/4652
USPC ....... 358/1.9, 3.26, 3.27, 505, 518, 522, 538
See application file for complete search history.

(56) References Cited

U.S. PATENT DOCUMENTS

| | | | |
|---|---|---|---|
| 5,287,204 A * | 2/1994 | Koizumi .................. | H04N 1/56 358/530 |
| 5,721,628 A | 2/1998 | Takaragi et al. .............. | 358/518 |
| 5,740,333 A | 4/1998 | Yoh et al. ...................... | 358/109 |
| 8,351,097 B2 | 1/2013 | Sato .............................. | 358/505 |
| 9,007,666 B2 | 4/2015 | Sato ............................. | 358/505 |
| 2006/0008139 A1 | 1/2006 | Hirota et al. ................. | 382/162 |

FOREIGN PATENT DOCUMENTS

JP    2001-103301    4/2001

* cited by examiner

*Primary Examiner* — Jamares Q Washington
(74) *Attorney, Agent, or Firm* — Venable LLP

(57) ABSTRACT

An image processing apparatus determines whether each of pixels in a scanned image is a color pixel or a monochrome pixel, determines whether each of blocks including the multiple pixels in the scanned image is a color block or a monochrome block, based on determination results of the respective pixels, and determines that the scanned image is a color image in a case where an arrangement pattern of blocks determined to be color blocks matches a predetermined pattern.

21 Claims, 16 Drawing Sheets

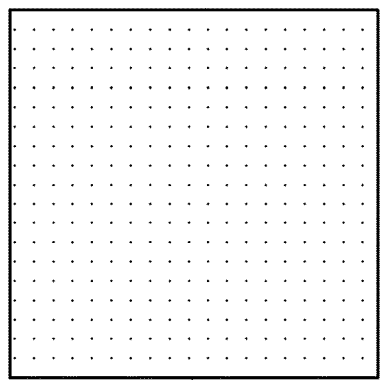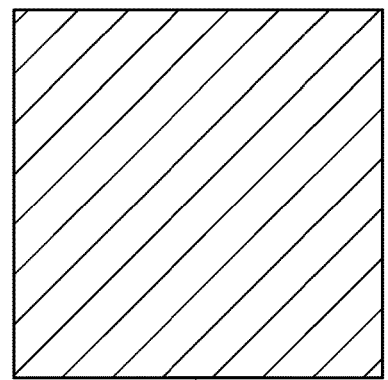
1501　　　　　　　　　　1502
FIG.15

IMAGE PROCESSING APPARATUS AND IMAGE PROCESSING METHOD IN WHICH COLOR AND MONOCHROME IMAGES ARE DISTINGUISHED

This application is a division of application Ser. No. 14/731,336 filed Jun. 4, 2015, currently pending; and claims priority under 35 U.S.C. § 119 to Japan Application 2014-120786 filed in Japan on Jun. 11, 2014; and the contents of all of which are incorporated herein by reference as if set forth in full.

BACKGROUND OF THE INVENTION

Field of the Invention

The present invention relates to an image processing apparatus and an image processing method for determining whether a document read by a reading device is a color document or a monochrome document.

Description of the Related Art

There is known a technique for determining whether a scanned image read by a reading device is a color image or a monochrome image (hereafter, referred to as color/monochrome determination technique). In this determination, it is determined whether a read document is a color document or a monochrome.

In the color/monochrome determination technique, in order to detect small color contents, there is used a technique of dividing the scanned image into blocks and determining whether each block is a color block or a monochrome block. Specifically, block regions are provided in the scanned image and it is determined whether each block region is a color block region or not based on the number of color pixels in the block region. If the number of color blocks is greater than a threshold value, the scanned image is determined to be a color image. However, in cases such as where a sheet of a document is recycled paper containing impurities and the like, a block including many impurities is erroneously determined to be a color block. Moreover, in a case where a false color is generated in edge portions of monochrome contents due to color shift of the scanning device, a block including a large amount of false color and the like is erroneously determined to be a color block. This determination method thus has a problem that, as a result, the document is erroneously determined to be color despite the fact that contents in the document are monochrome.

A method of detecting consecutiveness of color blocks is proposed to avoid this problem (see Japanese Patent Laid-Open No. 2001-103301). Japanese Patent Laid-Open No. 2001-103301 discloses a technique of determining that a scanned image is a color image in a case where the number of groups of consecutive color blocks is greater than a certain threshold value.

However, color blocks are not necessarily arranged consecutively in a case where contents in the image are large color contents or small color contents such as a string of letters of a small point size. Accordingly, this technique has a problem that correct determination cannot be made depending on the sizes, shapes, and arrangement of the contents.

SUMMARY OF THE INVENTION

An image processing apparatus of the present invention comprises: an obtaining unit configured to obtain a scanned image including a plurality of blocks, each of the blocks including a plurality of pixels; a first determination unit configured to determine whether each of the blocks is a color block or a monochrome block; and a second determination unit configured to determine whether the scanned image is a color image or a monochrome image by comparing an arrangement of blocks determined to be color blocks by the first determination unit and a predetermined pattern formed of color blocks and monochrome blocks with each other.

Further features of the present invention will become apparent from the following description of exemplary embodiments (with reference to the attached drawings).

BRIEF DESCRIPTION OF THE DRAWINGS

FIG. 15 is a view showing examples of low-density portions in an embodiment.

DESCRIPTION OF THE EMBODIMENTS

Figure 1:
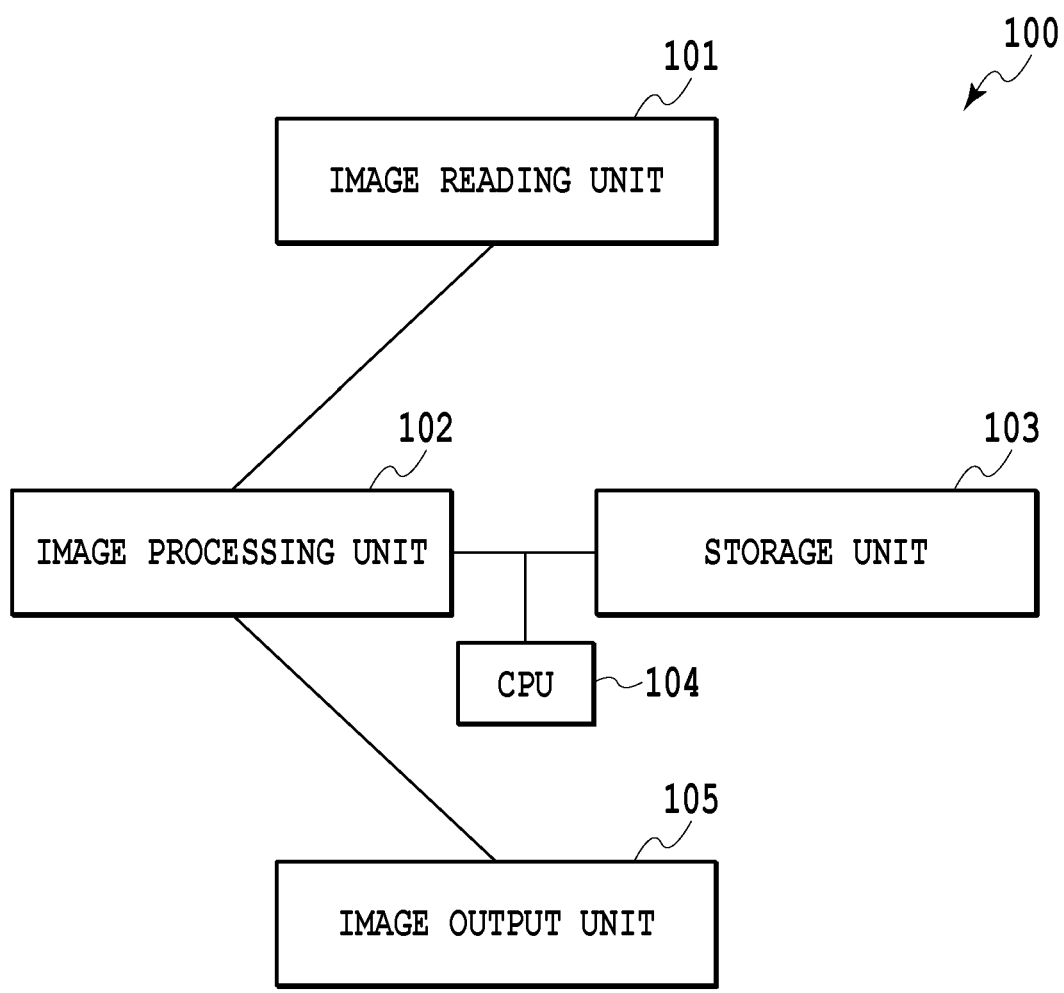
FIG. 1 is a view showing a configuration of an image processing apparatus in an embodiment.

Embodiments of the present invention are described below by using the drawings. Note that the configurations shown in the following embodiments are merely examples and the present invention is not limited to the configurations shown in the drawings.

Embodiment 1

[Configuration of Image Processing Apparatus]

FIG. 1 is a block diagram showing a configuration of an image processing apparatus 100. As shown in FIG. 1, the image processing apparatus 100 includes an image reading unit 101, an image processing unit 102, a storage unit 103, a CPU 104, and an image output unit 105. The image processing apparatus is connectable to a server configured to manage image data, a personal computer (PC) configured to instruct execution of printing, and the like via a network and the like.

The image reading unit 101 reads an image of a document and outputs image data. The image processing unit 102 performs image processing such as color space conversion processing and processing of determining whether image data received from the image reading unit 101 or the outside is a color or monochrome image data (hereafter, referred to as color/monochrome determination), and stores the image data in a buffer of the storage unit 103. Details of the color/monochrome determination processing are described later. The image processing unit 102 also generates bitmap data based on the stored image data, performs printer gamma correction processing and dithering processing on the generated data, and then outputs the data from the image output unit 105.

The storage unit 103 is formed of a ROM, a RAM, a hard disk (HD), and the like. The ROM stores various control programs and image processing programs which are executed by the CPU 104. The RAM is used as a reference space for data reference and a work space for data. Moreover, the RAM and HD are used in the aforementioned storing of the image data. In the RAM and the HD, the image data is stored, pages are sorted, a document including multiple sorted pages is stored, and print output of multiple copies is performed. The image output unit 105 outputs a color image by forming the color image on a recording medium such as recording paper.

[Overall View of Apparatus]

Figure 2:
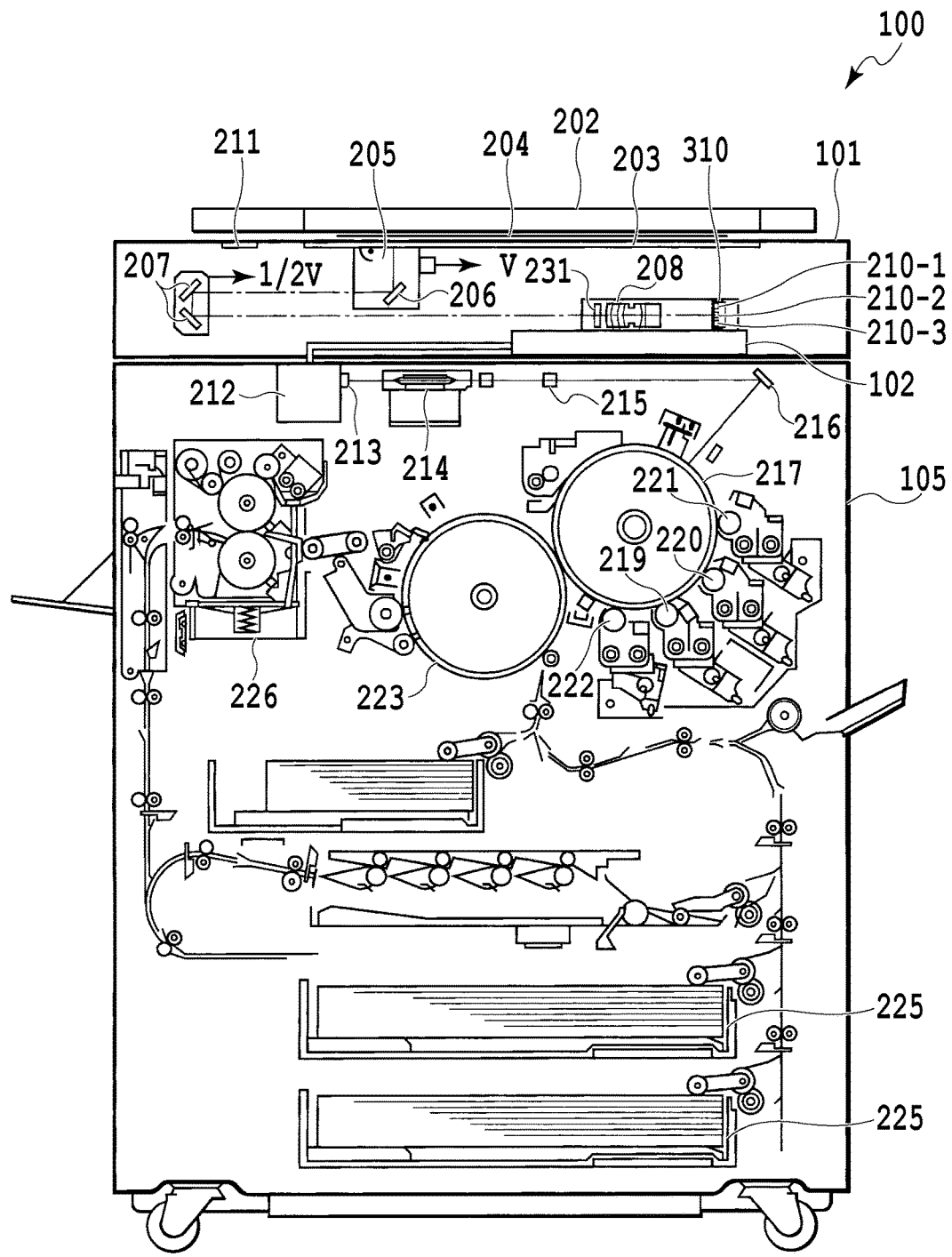
FIG. 2 is an overall view of the image processing apparatus in the embodiment.

FIG. 2 is an overall view of the image processing apparatus 100 in the embodiment. The configurations which are the same as those in FIG. 1 are denoted by the same reference numerals. In the image reading unit 101, a document 204 from which an image is to be read is placed between a document table glass 203 and a document pressing plate 202 and is illuminated with light of a lamp 205. Light reflected from the document 204 is guided by mirrors 206 and 207 and is focused into an image on a three-line sensor 210 by a lens 208. The lens 208 is provided with an infrared blocking filter 231. A not-illustrated motor moves a mirror unit including the mirror 206 and the lamp 205 in the direction of the arrow at a speed of V, and moves a mirror unit including the mirrors 207 in the direction of the arrow at a speed of V/2. In other words, the mirror units are moved in a direction (sub-scanning direction) perpendicular to an electric scanning direction (main scanning direction) of the three-line sensor 210 to scan an entire surface of the document 204.

The three-line sensor 210 formed of three lines of CCD sensors performs color separation on received optical information, reads color components of red R, green G, and blue B in full color information with corresponding line sensors, and sends signals of the color components to the image processing unit 102. The CCD sensors forming the three-line sensor 210 each have a light receiving element of 7000 pixels and can read an A3-size document, which is the maximum document size placeable on the document table glass 203, at a resolution of 600 dpi in a direction in which the shorter side of the document extends (297 mm).

A standard white plate 211 is provided to correct data read by each of CCD sensors 210-1 to 210-3 in the three-line sensor 210. The color of the standard white plate 211 is white which has substantially uniform reflection characteristics in a visible light.

Since the sensors for the respective colors in the three-line sensor 210 are physically spaced away from one another, there is a difference in time of reading a printed object at the same coordinates on the document 204 among the sensors. Generally, image signals can be read with this difference being corrected by adjusting the distances among the sensors. However, this correction is made under the assumption that the aforementioned movement of each of the mirror units in the sub-scanning direction is smooth uniform motion. If the speed of the motion is not uniform, reading positions of RGB shift, and a false color appears at an edge of a black printed object which actually has no color difference in RGB. The false color refers to a situation where a color which is actually not present appears in an image. The motion by the motor inevitably includes sections in which acceleration and deceleration is made and the speed is not uniform, particularly in start and end of the motion, and the false color tends to occur in such sections. Furthermore, it is difficult to completely eliminate the false color due to tolerances in attachment of the sensors, and there is a case where the false color occurs in a section other than the sections in the start and end of the motion by the motor. Specifically, color shift includes a first color shift caused by acceleration and deceleration in the movement of the mirror units and a second color shift caused by other reasons. This shift in reading positions for the respective colors in the reading by the three-line sensor is collectively referred to as color shift. Processing considering the color shift is performed in the color/monochrome determination processing to be described later.

That is the description of the processing of reading a document. Description is given below of processing of printing a read scanned image in the image processing unit 102. The image processing unit 102 electrically processes image signals received from the three-line sensor 210. For example, the image processing unit 102 performs color conversion processing on image data composed of RGB values to generate image signals indicating color components of cyan C, magenta M, yellow Y, and black K, and sends the generated CMYK image signals to the image output unit 105. An image outputted in this case is a CMYK image subjected to half-tone processing such dithering.

The image processing unit 102 automatically determines whether a received image is formed only of monochrome portions or includes color components. In a case where the image is formed only of monochrome portions, only K among the CMYK is used. This can achieve reduction of data, reduction of toner, and an increase in speed. Specific description is given below of a point that the reduction of data, the reduction of toner, and the increase in speed is made possible.

In the image output unit 105, the image signals of C (cyan), M (magenta), Y (yellow), or K (black) sent from the image processing unit 102 are sent to a laser driver 212. The laser driver 212 performs modulation driving of a semiconductor laser element 213 according the received image signals. A laser beam outputted from the semiconductor laser element 213 and traveling through a polygon mirror 214, an f-θ lens 215, and a mirror 216 scans a photosensitive drum 217 to form an electrostatic latent image on the photosensitive drum 217.

A developing device is formed of a magenta developing unit 219, a cyan developing device 220, a yellow developing device 221, and a black developing device 222. The four developing devices come into contact with the photosensitive drum 217 one after another to develop the electrostatic latent image formed on the photosensitive drum 217 with toners of corresponding colors, and thereby form toner images. The recording paper fed from a recording paper cassette 225 is wound around a transfer drum 223, and the toner images on the photosensitive drum 217 is transferred onto the recording paper.

In a case where the result of the aforementioned color/monochrome determination processing is monochrome, there is no need to bring the cyan, magenta, and yellow developing devices into contact with the photosensitive drum 217, and only the processing of the black developing device is performed. Accordingly, the processing time is greatly reduced. Moreover, in a case where the image processing unit 102 determines that the received image is formed only of monochrome portions, the image processing unit 102 only needs to generate image signals corresponding to K in the color conversion processing. Accordingly, the amount of data can be reduced. Moreover, since only the black developing device is used, the usage amounts of toners of C, M, and Y can be reduced.

The recording paper on which the toner images of four colors of C, M, Y, and K are sequentially transferred as described above passes through a fixation unit 226, and the toner images are thereby fixed. Then, the recording paper is delivered to the outside of the apparatus.

[Image Processing Unit]

Figure 3:
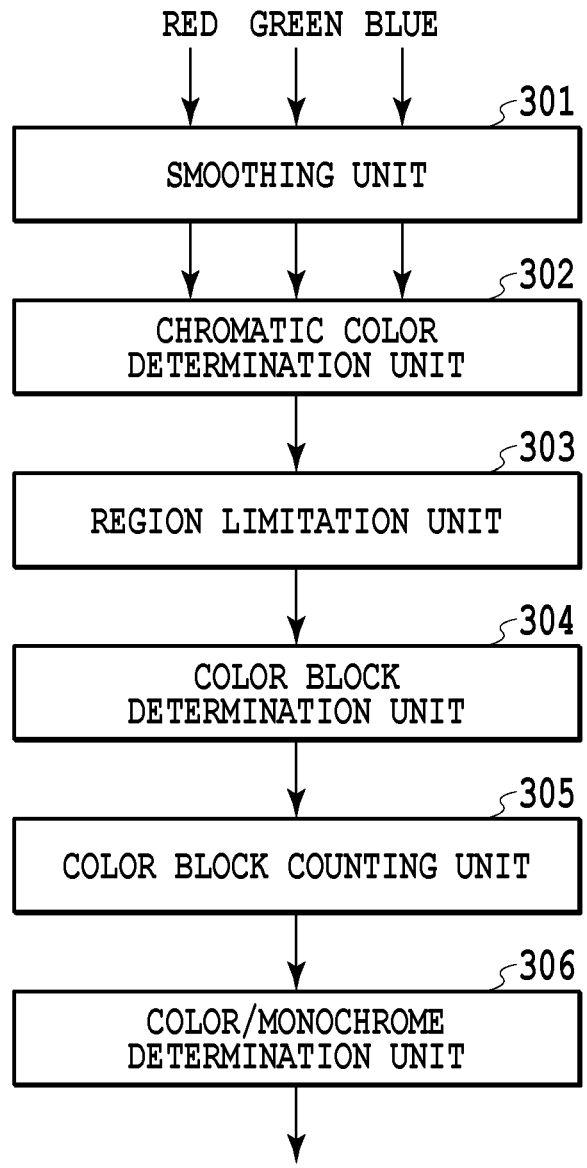
FIG. 3 is a processing block diagram of color/monochrome determination in the embodiment.

Overall description is given of the aforementioned color/monochrome determination processing in the image processing unit 102 by using FIG. 3. Note that details of processes in the color/monochrome determination processing are described later.

The processes described below are achieved as follows: the CPU 104 loads a program on the RAM from the ROM or the hard disk of the storage unit 103 and executes calculation processing based on program codes of the program. The CPU 104 performs image calculation processing while saving and loading the image data obtained by the image reading unit 101 and intermediate data generated in the processes, to and from the RAM as appropriate.

First, the image processing unit 102 receives the read image data expressed in RGB from the image reading unit 101. Description is given assuming that the directions of the image received herein are such that the main scanning direction is a direction in which rows of the line sensors extend in the image reading unit 101, and the sub-scanning direction is a sensor movement direction in the image reading unit 101. The line sensors are arranged in the sub-scanning direction. Accordingly, the false color which tends to occur due to color shift caused by the shift in the reading positions of the line sensors occurs in such a direction that the false color occurs in a narrow shape extending in the main scanning direction.

A smoothing unit 301 performs smoothing processing on the image data and suppresses effects of the color shift and a noise generated by the image reading unit 101. The noise in the embodiment is not a noise caused by the shift in the reading positions of the line sensors but a noise caused by the document itself. For example, in a case where the document is recycled paper, an image processing apparatus sometimes determines that the document has a chromatic color portion on a surface even though the document is not printed in color. Determination of whether a pixel of the read image data is a color pixel or a monochrome pixel based on the pixel is susceptible to the aforementioned color shift and the noise in the image. The smoothing unit 301 thus suppresses the effects of the color shift and noise. Note that the color shift suppressed by the smoothing unit 301 is the second color shift which occurs mainly due to the shift in the reading positions of the line sensors as described above.

A chromatic color determination unit 302 determines whether a target pixel in the image subjected to smoothing is a color pixel or a monochrome pixel, from the saturation S of the target pixel. Instead of simply determining whether the target pixel is a color pixel or a monochrome pixel, the chromatic color determination unit 302 may determine which one of a high-saturation pixel, a low-saturation pixel, and an achromatic color pixel the target pixel is. In the embodiment, description is given of an example in which the chromatic color determination unit 302 determines which one of the low-saturation pixel, the high-saturation pixel, and the achromatic color pixel the target pixel is, and outputs the result of this saturation determination.

A region limitation unit 303 limits a region in which the color/monochrome determination is performed in the scanned image to suppress effects of the first color shift caused by the acceleration and deceleration of the mirror units in the movement thereof. In a leading edge region and a trailing edge region, in the sub-scanning direction, of the document 204 read by the image reading unit 101, the first color shift caused by the acceleration and deceleration of the mirror units occurs in some cases. In such regions, a portion which should be determined to be a monochrome portion may be erroneously determined to be a color portion, due to the color shift. The region limitation unit 303 thus excludes such regions in advance from regions to be subjected to the color/monochrome determination.

A color block determination unit 304 determines whether each of blocks is a color block based on the number of chromatic color pixels in a block region. Details will be described later.

A color block counting unit 305 detects color block groups while performing pattern matching and counts the number of color block groups. Details will be described later.

A color/monochrome determination unit 306 determines whether the document 204 is a color document or a monochrome document based on the number of color block groups. Details will be described later.

[Smoothing Unit]

As described above, the smoothing unit 301 performs processing of suppressing the effects of noise and color shift. In the smoothing, the smoothing unit 301 can suppress the effects of noise and color shift by performing smoothing in a sufficiently large area. For example, since the aforementioned second color shift occurs due to the shift in the reading positions of the sensors arranged in the sub-scanning direction, suppressing effects can be improved by obtaining averages in a region longer in the sub-scanning direction. However, in a method where the smoothing is performed simply in a large area, there is a case where a pixel which is actually a color pixel is smoothed by surrounding pixels and the image processing apparatus determines that the pixel is not a color pixel but a monochrome pixel. In other words, erroneous determination may be made in the color/monochrome determination. In view of this, the smoothing unit 301 of the embodiment performs processing of suppressing the effects of noise and color shift while suppressing the erroneous determination.

Figure 4:
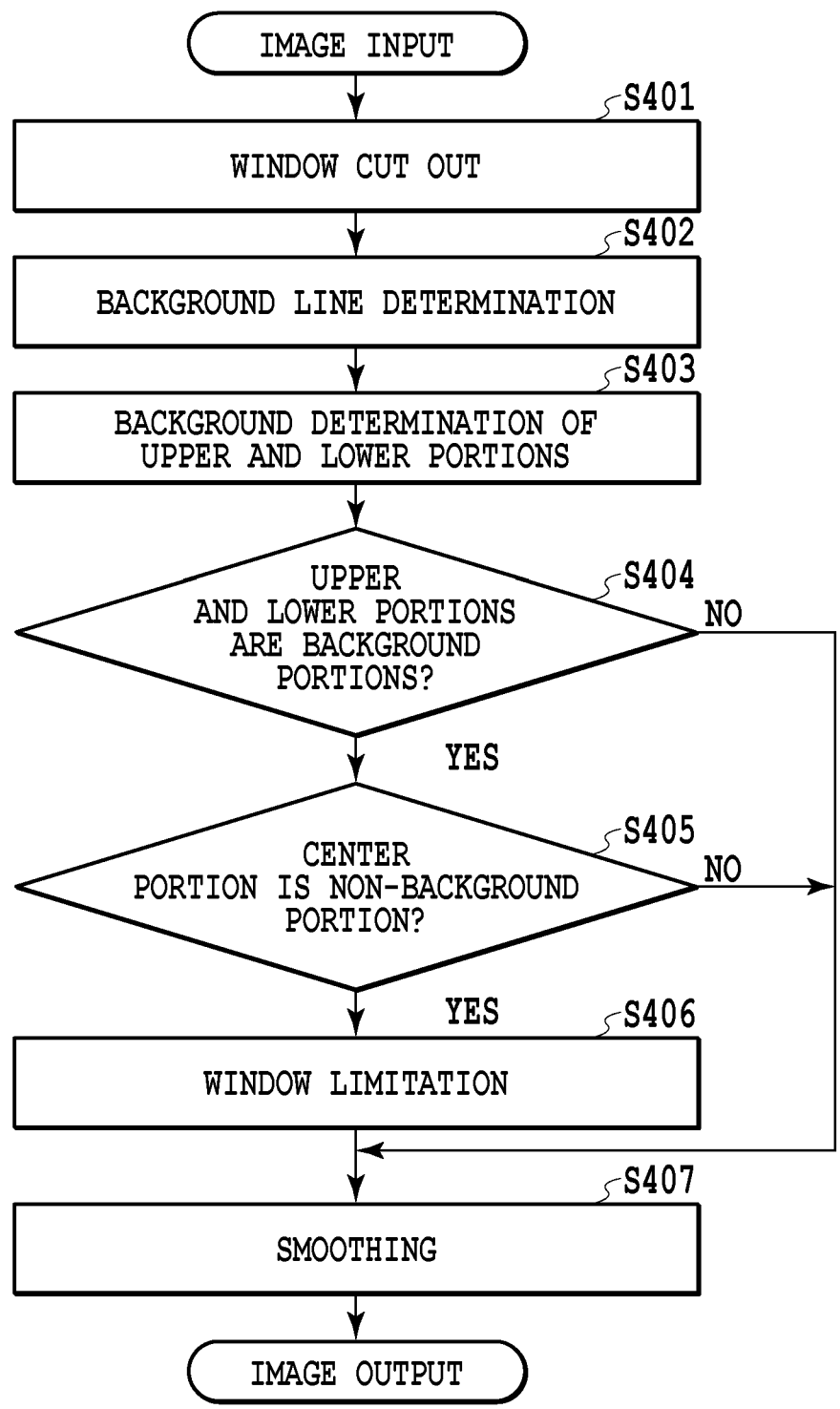
FIG. 4 is a flowchart showing a processing flow of a smoothing unit in the embodiment.
Figure 5:
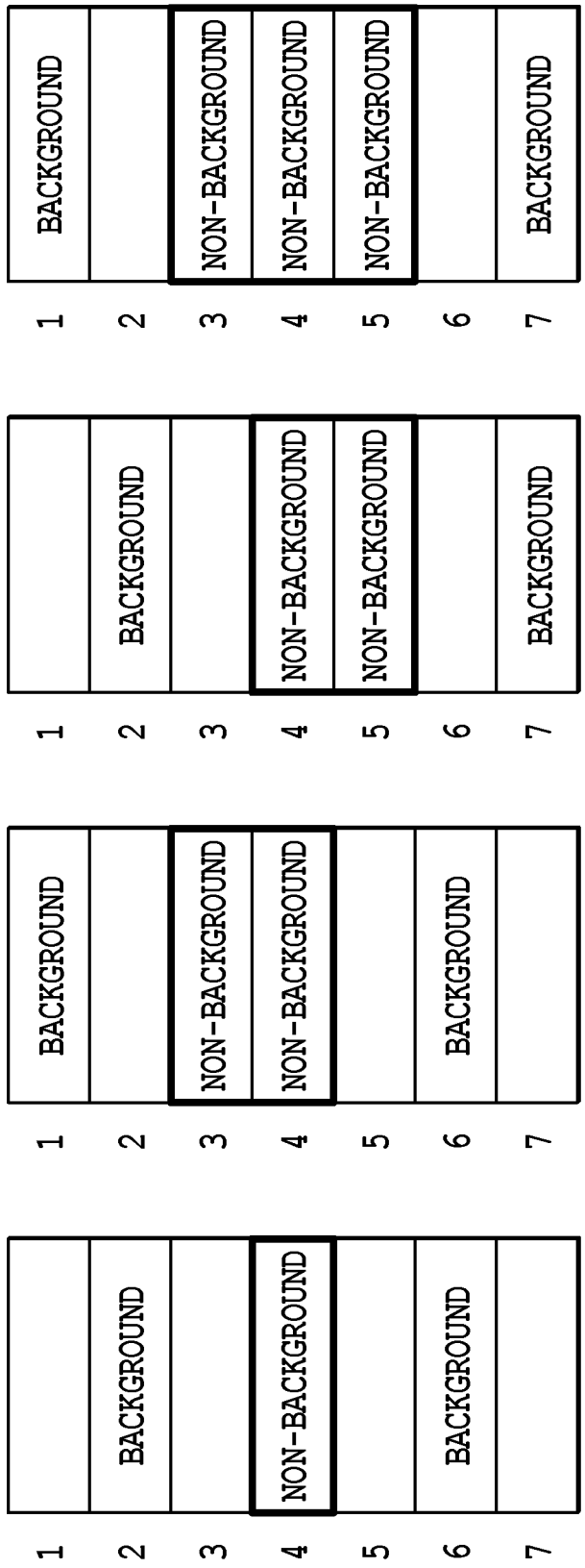
FIGS. 5A to 5D are views for explaining window region limitation in smoothing processing in the embodiment.

A processing flow of the smoothing unit 301 is described by using FIG. 4. In step S401, upon receiving image data composed of RGB, the smoothing unit 301 cuts out a window including multiple pixels from the image. Specifically, description is given assuming that the window has a size of three pixels horizontal by seven pixels vertical, the position of a target pixel of the window is at the center pixel of the window, and a line including the target pixel is a target line. FIGS. 5A to 5D are views showing examples of the windows. In FIGS. 5A to 5D, one line is formed of three pixels arranged in the horizontal direction. Description using FIGS. 5A to 5D will be given later. The window has a shape elongated in the vertical direction for the following reason. Since the color shift is a shift in the sub-scanning direction, the effects of suppressing the color shift can be improved by setting the window to have a longer length in the sub-scanning direction. Next, in step S402, the smoothing unit 301 determines whether each of the seven lines in the window is a background portion. Specifically, in a case where all three pixels forming a line are background pixels, the smoothing unit 301 determines that the line is a background line. In a case where at least one of the pixels is not a background pixel, the smoothing unit 301 determines that the line is a non-background line. The smoothing unit 301 determines whether each pixel is a background pixel by determining whether each of input pixel values is within a range of values which has a certain width based on RGB values expressing a sheet background of the inputted document. For example, the smoothing unit 301 determines that a pixel is a background pixel in a case where input pixel values R, G, and B satisfy the following conditions:

if $((R1-W/2<R<R1+W/2)$ AND $(G1-W/2<G<G1+W/2)$ AND $(B1-W/2<B<B1+W/2))$, where R1, G1, and B1 are RGB values of the background and W is a background allowable width. The values of R1, G1, and B1 may be predetermined values or results obtained by performing publicly-known background determination processing in which determination is made automatically depending on the sheet.

In step S403, the smoothing unit 301 determines whether a background portion exists in each of upper and lower regions of the window, based on a result of the determination of whether each of the lines is a background line. Specifically, the lines of the window are referred to as line 1 to line 7 from above, the lines 1 and 2 among these lines are defined as an upper portion, and the lines 6 and 7 among these lines are defined as a lower portion.

In step S404, the smoothing unit 301 determines whether there are background portions in both of the upper portion and the lower portion of the window. Specifically, the smoothing unit 301 determines that there are background portions in both of the upper and lower portions in a case where at least one of the lines 1 and 2 is a background line and at least one of the lines 6 and 7 is a background line, and the processing proceeds to step S405.

In step S405, the smoothing unit 301 further determines whether, in the window determined to include background portions in both of the upper and lower portions, a portion except background lines and lines adjacent thereto is a non-background portion. This is described with reference to FIGS. 5A to 5D. Processing proceeding to step S405 means that at least one of the lines 1 and 2 is a background line and at least one of the lines 6 and 7 is a background line. Accordingly, in the examples of FIGS. 5A to 5D, a center portion of the window including the target line is the portion except background lines and lines adjacent thereto, and is the target of the determination. For example, in a case where the background lines exist as in FIG. 5A, the line 4 which is the target line is the target of the determination of non-background portion. In a case where the lines 1 and 6 are the background lines as in FIG. 5B, the line 3 and the line 4 which is the target line are the target of the determination of non-background portion. By performing such determination processing, it is possible to check whether small color contents whose heights are smaller than four pixels exist in the window to extend in the horizontal direction. In a case where the portion except background lines and lines adjacent thereto is a non-background portion, the processing proceeds to step S406 and the smoothing unit 301 performs window limitation. In the smoothing processing of step S407 to be described later, the smoothing unit 301 performs the smoothing processing based on the window. In this case, the smoothing unit 301 performs the smoothing processing based on the window limited in step S406.

In step S406, the smoothing unit 301 limits the region of the window to a region determined to be a non-background portion in step S405. Specifically, the smoothing unit 301 limits the region of the window determined to include small color contents to a region from which background portions are excluded and in which the color contents exist. FIGS. 5A to 5D illustrate four types of situations. For example, in a case where the smoothing unit 301 determines that the lines 2 and 6 are background lines and the target line 4 is a non-background line as in FIG. 5A, the smoothing unit 301 limits the region of the window to a region of three pixels horizontal by one pixel vertical which includes only the target line. Similarly, in a case where the lines 1 and 6 are background lines and the lines 3 and 4 are non-background lines as in FIG. 5B, the smoothing unit 301 limits the region of the window to a region of three pixels horizontal by two pixels vertical which includes the lines 3 and 4. Moreover, in a case where the lines 2 and 7 are background lines and the lines 4 and 5 are non-background lines as in FIG. 5C, the smoothing unit 301 limits the region of the window to a region of three pixels horizontal by two pixels vertical which includes the lines 4 and 5. Furthermore, in a case where the lines 1 and 7 are background lines and the lines 3, 4, and 5 are non-background lines as in FIG. 5D, the smoothing unit 301 limits the region of the window to a region of three pixels horizontal by three pixels vertical which includes the lines 3, 4, and 5.

In the determination, lines adjacent to background lines are also excluded because effects of the contents of the background lines on these regions are not small and including these lines in the window may decrease the saturation of the small color contents.

Lastly, in step S407, the smoothing unit 301 performs the smoothing processing on pixels in the window. In a case where the smoothing unit 301 has limited the window in step S406, the smoothing unit 301 performs the smoothing processing on pixels in the limited window. In a case where step S406 is skipped, the smoothing unit 301 performs the smoothing processing on pixels in the window of the predetermined size (three pixels horizontal by seven pixels vertical in this case). The smoothing unit 301 executes the smoothing processing by obtaining, for example, the average of pixel values in the window. Then, the smoothing unit 301 replaces the pixel value of the target pixel with the obtained average. The smoothing of the scanned image is performed by performing such processing with each of the pixels in the scanned image being set as the target pixel. The number of pixels used in each operation of obtaining the average varies depending on the limiting of the window.

Excluding background portions from the target of smoothing in the window in which small color contents may exist as described above can prevent the small color contents from being blurred and prevent decrease in the saturation of the small color contents in a case where the small color contents has a chromatic color. Meanwhile, in a case where there are no small color contents, it is possible to sufficiently exert the effects of smoothing and remove the noise and color shift included in the image.

Note that the background line determination in the aforementioned step S402 is performed to prevent decrease in the saturation of small color contents having a significant chromatic color and to avoid erroneous determination that pixels are achromatic color pixels. Accordingly, there is no need for the RGB values R1, G1, B1 of the background to be values expressing a chromatic color, and the background is an achromatic color background. In other words, the values of R1, G1, and B1 are values close to one another.

Moreover, in the aforementioned description, there is described a configuration in which the smoothing unit 301 determines whether each line in the window is a background line and excludes background lines and lines adjacent thereto from the target of smoothing. However, the smoothing unit 301 may perform determination of whether a certain portion is a background portion in units of pixels instead of lines. Moreover, in the aforementioned description, there is described a configuration in which lines adjacent to background lines in the upper and lower portions are excluded from the target of smoothing. However, lines adjacent to background lines and pixels adjacent to background pixels can be weakly reflected as the target of smoothing without being completely excluded. Furthermore, in the aforementioned description, there is described an example in which the window is limited in a case where there are background portions in lines in both of the upper and lower portions. However, the window may be limited in a case where there is a background portion in a line in one of the upper and lower portions. Moreover, although the description is given by using the window of three pixels horizontal by seven pixels vertical, the window is not limited to this example. The number of lines and the like used in the aforementioned determination of background line in the upper and lower portions can be changed depending on a change in the number of pixels used in the window.

Furthermore, although description is given of an example in which the smoothing processing is performed by obtaining the average of the pixel values in the window, it is possible to perform filter processing by using a smoothing filter in which, for example, the line center is weighted. In this case, there may be used a filter in which no weight is given to the aforementioned background portions and portions adjacent thereto are slightly weighted.

[Chromatic Color Determination Unit]

Next, processing of the chromatic color determination unit 302 is described. The chromatic color determination unit 302 determines which one of the high-saturation pixel, the low-saturation pixel, and the achromatic color pixel a target pixel in the image subjected to the smoothing by the smoothing unit 301 is from the saturation S of the target pixel, and outputs the result of the saturation determination. The saturation S can be calculated by using, for example, the following formula.

$$S = MAX(R,G,B) - MIN(R,G,B) \quad \text{formula (1)}$$

In this formula, MAX(R, G, B) express the maximum values of the respective colors of R, G, and B, and MIN (R, G, B) express the minimum values of the respective colors of R, G, and B. The chromatic color determination unit 302 performs the following threshold processing for the thus-calculated saturation S to determine which one of the high-saturation pixel, the low-saturation pixel, and the achromatic color pixel the target pixel is:

if (S<Th1) Then achromatic color pixel
else if (S<Th2) Then low-saturation pixel
else high-saturation pixel
where Th1<Th2.

[Region Limitation Unit]

Figure 6:
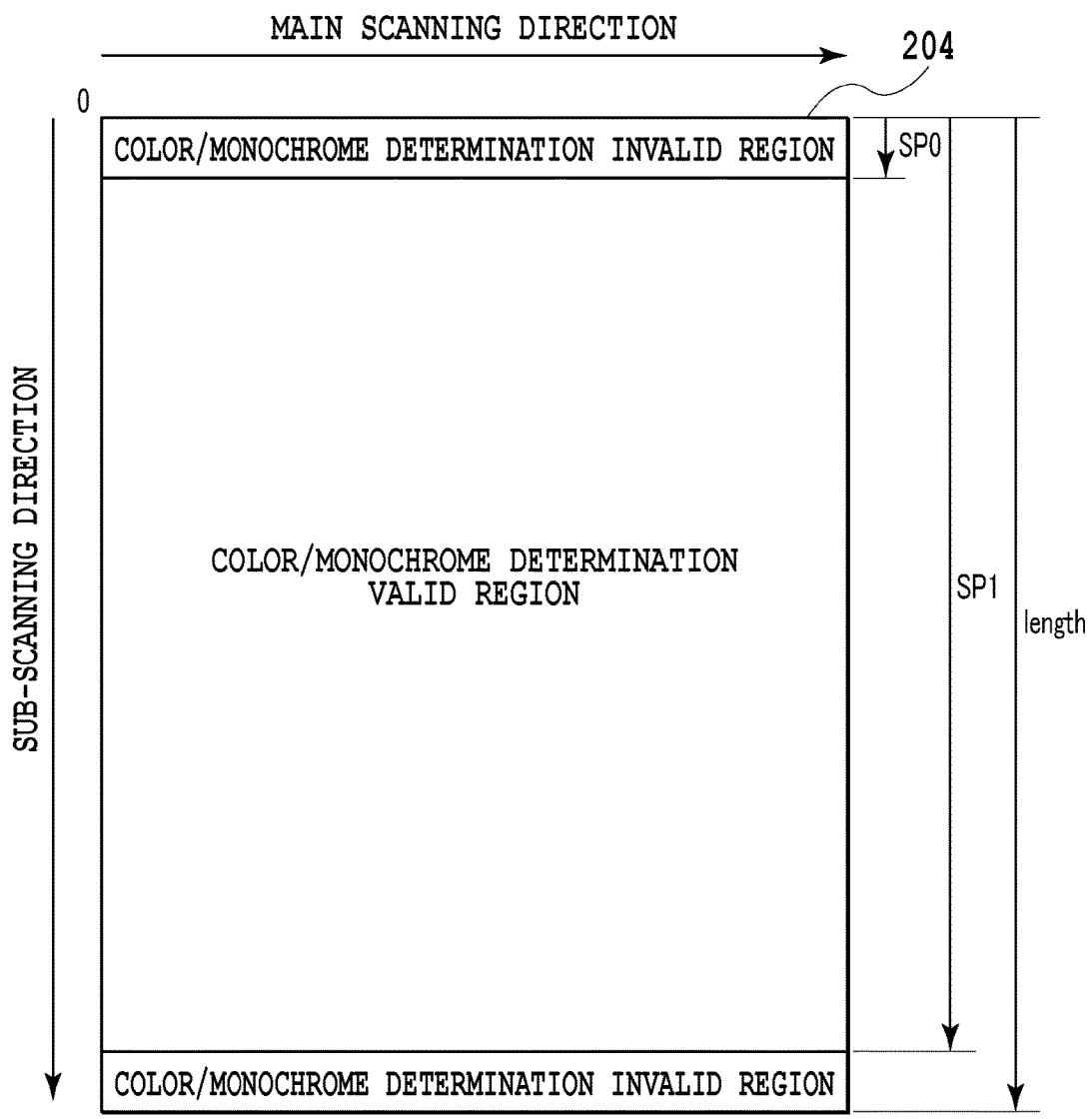
FIG. 6 is a view showing an example of a region limited by a region limitation unit in the embodiment.

Next, processing of the region limitation unit 303 is described. FIG. 6 is a view showing an example of a region limited by the region limitation unit 303. The region limitation unit 303 sets sp0, sp1, and length from the original point side in the sub-scanning direction, where length is the length of the document. Such coordinate specification can divide a region of the document into a color/monochrome determination valid region and color/monochrome determination invalid regions as shown in the drawings. Specifically, the region limitation unit 303 forcibly replaces the determination results of the chromatic color determination unit 302 with determination results that pixels are achromatic color pixels, for all of the pixels in the color/monochrome determination invalid regions. The color/monochrome determination processing can be thus performed only for the pixels in the color/monochrome determination valid region.

Note that the color/monochrome determination invalid regions are not limited to a leading edge region and a trailing edge region of the document in the sub-scanning direction, and may be set to left and right end regions or multiple portions in the document.

[Color Block Determination Unit]

Figure 7:
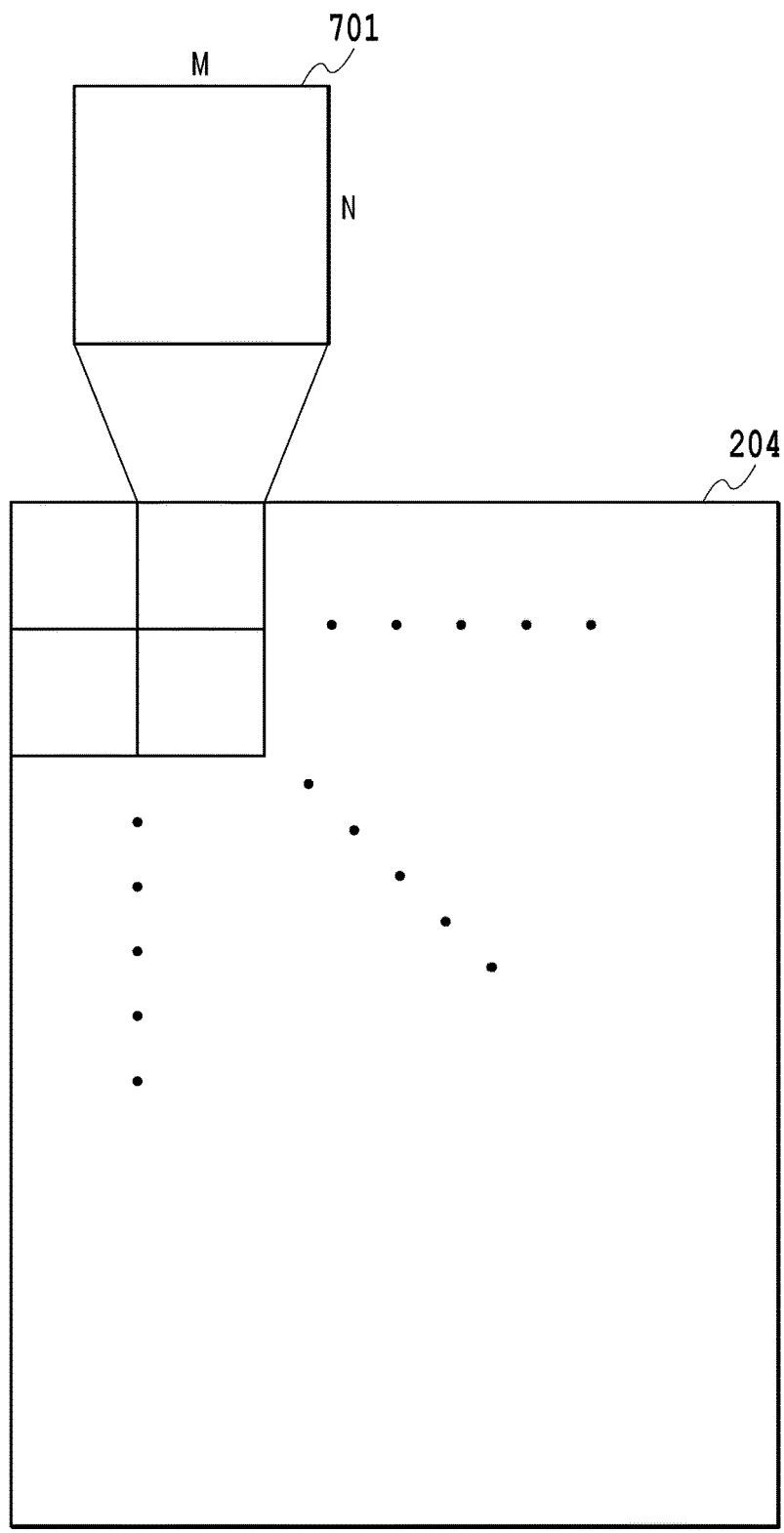
FIG. 7 is a view for explaining block regions in the embodiment.

Next, processing of the color block determination unit 304 is described. The color block determination unit 304 divides the scanned image obtained from the document 204 into block regions 701 each formed of M×N (M and N are integers) pixels as shown in FIG. 7. Then, the color block determination unit 304 determines whether each of the blocks is a color block based on the results of the chromatic color determination unit 302. For example, in a case where image scanning is performed in 600 dpi and the size of each block is set to 16 pixels by 16 pixels, the size of each block is close to the size of a letter of 3 pt (American point: 1 pt≈0.35 mm).

Figure 8:
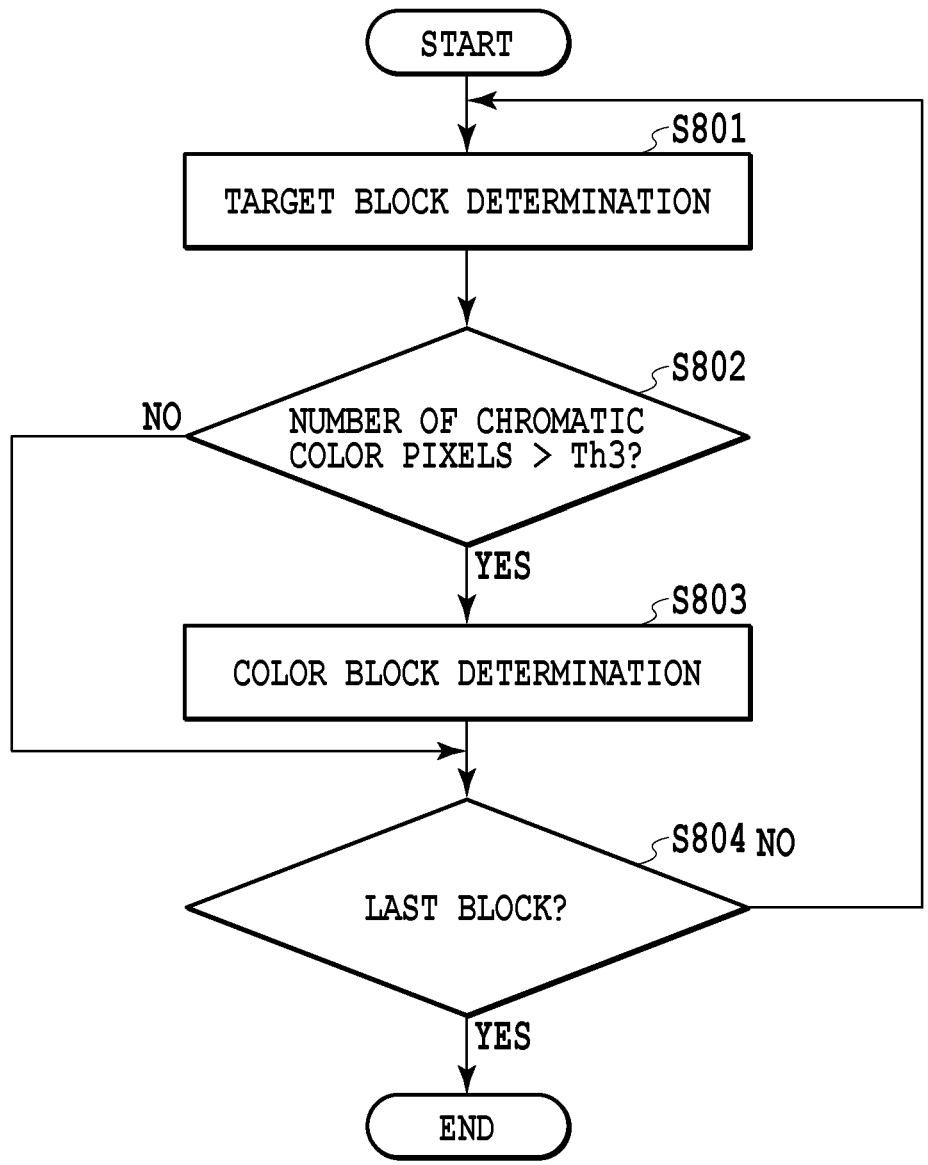
FIG. 8 is a flowchart showing a processing flow of a color block determination unit in the embodiment.

FIG. 8 is a flowchart for explaining an operation of the color block determination unit 304. In step S801, the color block determination unit 304 determines a target block which is a target of the processing. In the embodiment, the first target block is a block on the original point side in the main scanning direction and the sub-scanning direction, and the target block moves to the next block in the main scanning direction every time the processing is repeated, and the same operation is repeated in the sub-scanning direction. The last target block is a block at a lower right corner of the document.

In step S802, the color block determination unit 304 compares the number of chromatic color pixels in the target block determined in step S801 and a preset threshold value Th3 with each other. In this case, the number of chromatic color pixels may be the total of the number of low-saturation pixels and the number of high-saturation pixels or, for example, the total of these numbers obtained with the number of high-saturation pixels being multiplied by a weighting factor.

In step S803, the color block determination unit 304 determines that the target block determined in step S801 is a color block in a case where the number of the chromatic color pixels is greater than Th3 in step S802. In step S804, the color block determination unit 304 returns to step S801 in a case where the target block is not the last block, and repeats the color block determination. The color block determination unit 304 can determine whether a block is a color block for all of the blocks in the scanned image by performing the operation described above.

Figure 9:
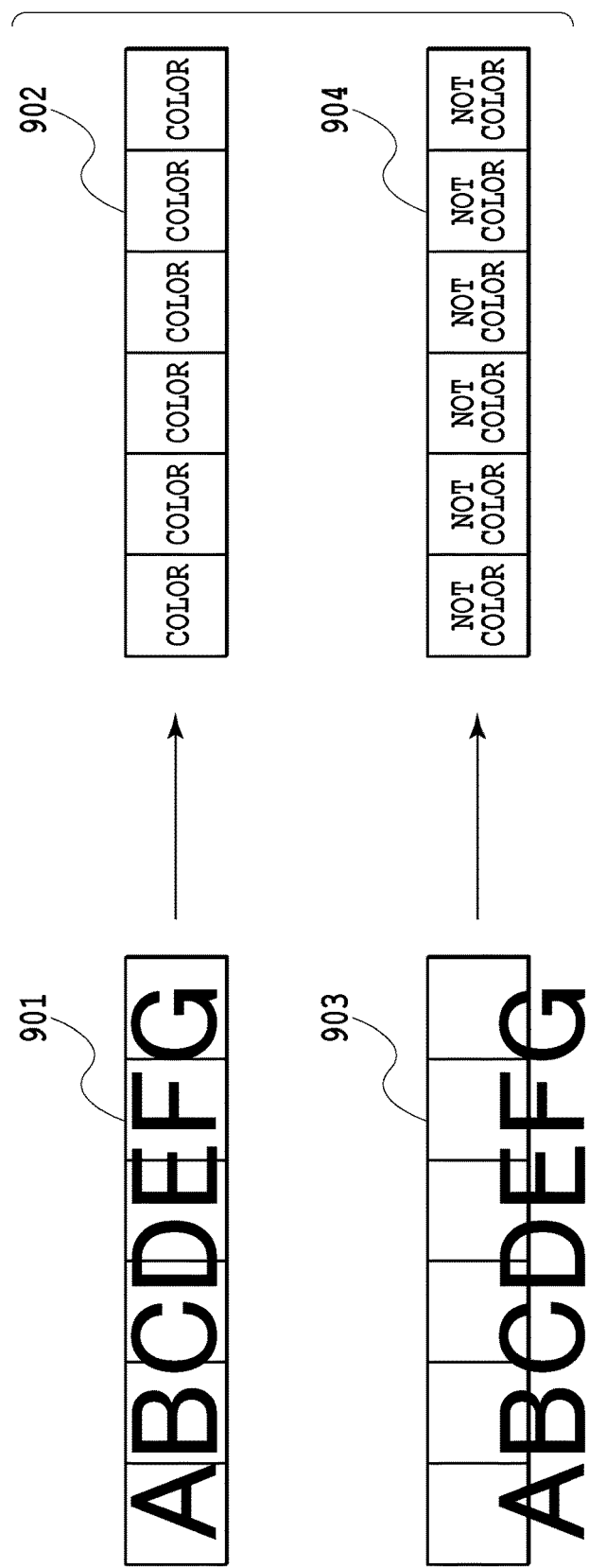
FIG. 9 is a view for explaining phases of color contents and block regions in the embodiment.

The phases of the color contents and the block regions in the document 204 are described. For example, in a case where the sizes of the color contents are close the size of the block regions as shown in FIG. 9, the result of the color block determination greatly varies depending on the phases of the color contents and the block regions. In a case where the phase relationship is like one denoted by reference numeral 901, no problem occurs since the color block determination unit 304 can determine that all of the blocks are color blocks as shown in the determination result for the blocks denoted by reference numeral 902. However, in a case where the phase relationship is like one denoted by reference numeral 903, the amount of chromatic color pixels in each of the blocks is reduced to about half of that of reference numeral 901. Hence, the color block determination unit 304 may determine that the number of chromatic color pixels does not reach the threshold value Th3 and the blocks are not color blocks, as in the result denoted by reference numeral 904. Description is given of a method for reducing effects of such phase relationships between the color contents and the block regions on the result of the color block determination.

Figure 10:
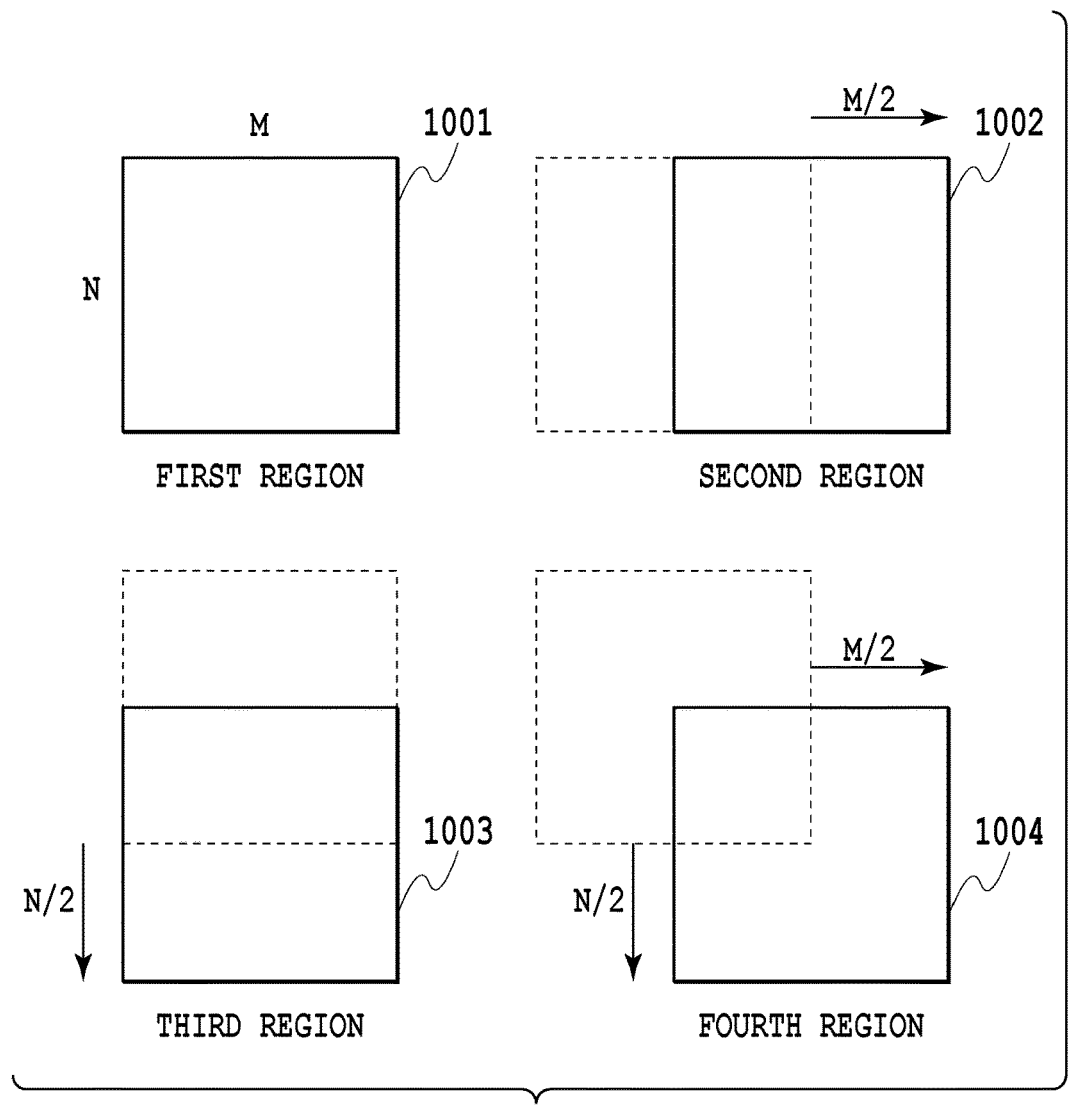
FIG. 10 is a view showing examples of regions in which the number of chromatic color pixels is counted in the embodiment.

FIG. 10 shows regions in which the number of chromatic color pixels is counted for a target block region of M×N pixels. The count number of chromatic color pixels in a first region 1001, i.e. the target block region is referred to as Cnt1. A second region 1002 is a region of M×N pixels moved by M/2 pixels in the main scanning direction from the first region 1001. The count number of chromatic color pixels in the second region 1002 is referred to as Cnt2. A third region 1003 is a region of M×N pixels moved by N/2 pixels in the sub-scanning direction from the first region 1001. The count number of chromatic color pixels in the third region 1003 is referred to as Cnt3. A fourth region 1004 is a region of M×N pixels moved by M/2 pixels in the main scanning direction and by N/2 pixels in the sub-scanning direction from the first region 1001. The count number of chromatic color pixels in the fourth region 1004 is referred to as Cnt4. The final chromatic color count number Cnt in the target block region is the largest value among Cnt1, Cnt2, Cnt3, and Cnt4 as shown in formula (2).

$$Cnt=Max(Cnt1,Cnt2,Cnt3,Cnt4) \quad \text{formula (2)}$$

This reduces the effects of the phase relationships between the color contents and the block regions on the result of the color block determination even in a situation like one denoted by reference numeral 903 of FIG. 9, and a result close to that denoted by reference numeral 902 in FIG. 9 can be obtained.

[Color Block Counting Unit]

Next, processing of the color block counting unit 305 is described. The color block counting unit 305 detects color block groups based on consecutiveness of the block regions subjected to the color block determination in the color block determination unit 304 and counts the number of color block groups. Each of the color block groups is a group of several blocks recognized as one aggregate. In the embodiment, in a case where a color block group matches a predetermined arrangement pattern, processing of incrementing the number of color block groups is performed.

Figure 11:
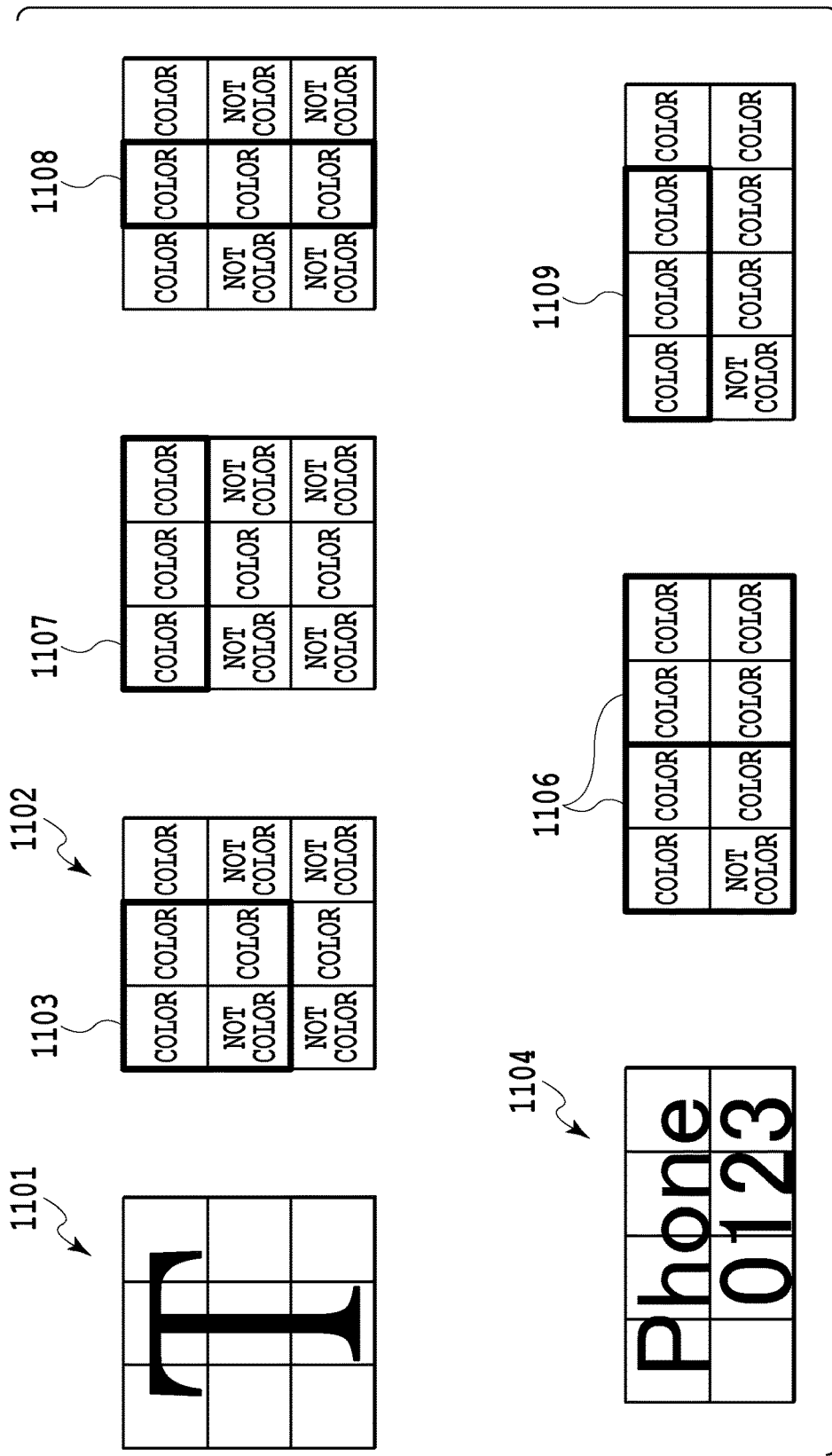
FIG. 11 is a view for explaining a color block group in the embodiment.

First, the color block group is described by using FIG. 11. Contents 1101 give an example of a case where color contents large relative to block regions exist. The contents 1101 show an example where a letter T which is the large color contents is sectioned into units of blocks. The letter T which is the large color contents is contents with a size corresponding to three blocks horizontal by three blocks vertical. A color block determination result 1102 shows a result of the color block determination for each of the blocks of the contents 1101. As is apparent from the color block determination result 1102, there are block regions which are not determined to be color blocks, depending on the shape of the color contents.

Meanwhile, contents 1104 give an example of a case where small color contents as large as block regions are arranged. The contents 1104 are contents in which numbers are arranged with an indentation after letters of "Phone". A color block determination result 1105 shows a result of the color block determination for each of the blocks of the contents 1104. As is apparent from the color block determination result 1105, there is a block region which is not determined to be a color block, depending on the arrangement of color contents.

In other words, there are block regions which are not determined to be color blocks in individual block regions, depending on the shapes and arrangement of color contents. In the embodiment, processing considering existence of block regions which are not determined to be color blocks as described above is performed in the counting of the number of color block groups. For example, assume a case where the color block determination unit 304 determines that a certain region is a color block group in a case where three or more color blocks exist in a window of 2×2 blocks as shown in a region 1103 and regions 1106. In such a case, the contents described above can be detected as color block groups. However, a case where three or more color blocks do not exist in a window of 2×2 blocks is conceivable depending on the shapes and arrangement of the color contents. In the embodiment, the color block determination unit 304 thus detects color block groups in consideration of various shapes and arrangement of color contents. For example, the color block determination unit 304 can detect a region 1107 and a region 1108 as color block groups for the large color contents 1101. Moreover, the color block determination unit 304 can detect a region 1109 as a color block group for the small color contents 1104. In these cases, three color blocks exist in windows of 3×1 blocks and a window of 1×3 blocks. As described above, since various color block groups are conceivable depending on the sizes of color contents and the size of block regions in the document 204, an example of a method of detecting such various color block groups is described below.

Figure 12:
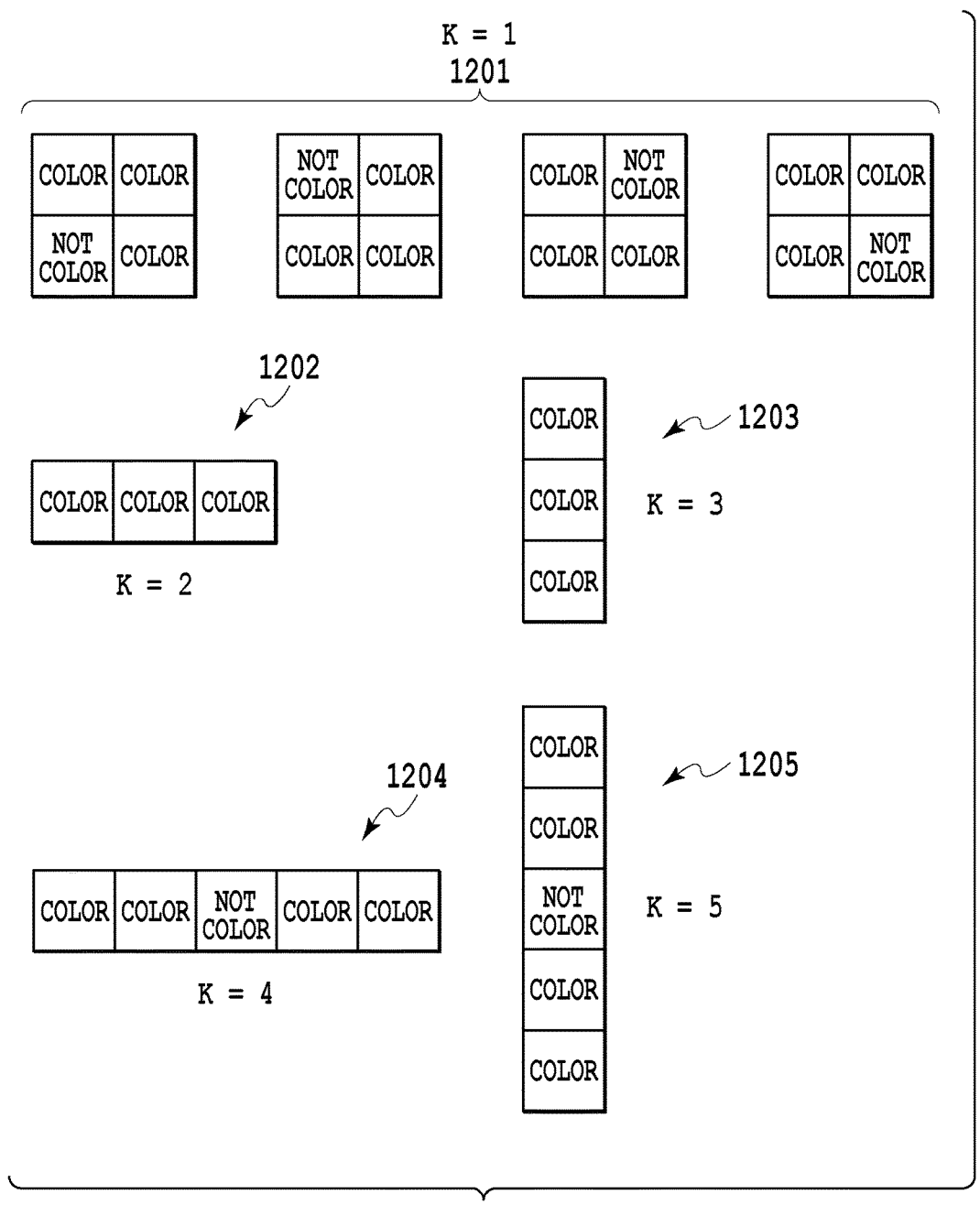
FIG. 12 is a view showing examples of color block group detection patterns in the embodiment.

FIG. 12 is a view showing examples of color block group detection patterns. A first color block group detection pattern 1201 is used to detect that one color block group is present in a case where three or more color blocks exist in a window of 2×2 blocks. A second color block group detection pattern 1202 is used to detect that one color block group is present in a case where three or more color blocks exist in a window of 3×1 blocks. A third color block group detection pattern 1203 is used to detect that one color block group is present in a case where three or more color blocks exist in a window of 1×3 blocks. A fourth color block group detection pattern 1204 is used to detect that one color block group is present in a case where four or more color blocks exist in a window of 5×1 blocks. A fifth color block group detection pattern 1205 is used to detect that one color block group exist in a case where four or more color blocks exist in a window of 1×5 blocks.

Using various detection patterns as described above enables complete detection of all of the color block groups.

However, in a case where various detection patterns are used, some color block groups may be detected redundantly. The following operation is performed to prevent redundant counting of detection results for each of groups. First, the detection patterns are given first to fifth priorities, respectively. In this example, the first color block group detection pattern is given the highest priority. In a case where one color block is detected with a pattern with a higher priority and the counting is performed, no counting is performed even if the same color block is detected with a pattern with a lower priority. This enables complete detection of all of the color block groups by using detection patterns like those shown in FIG. 12.

Figure 13:
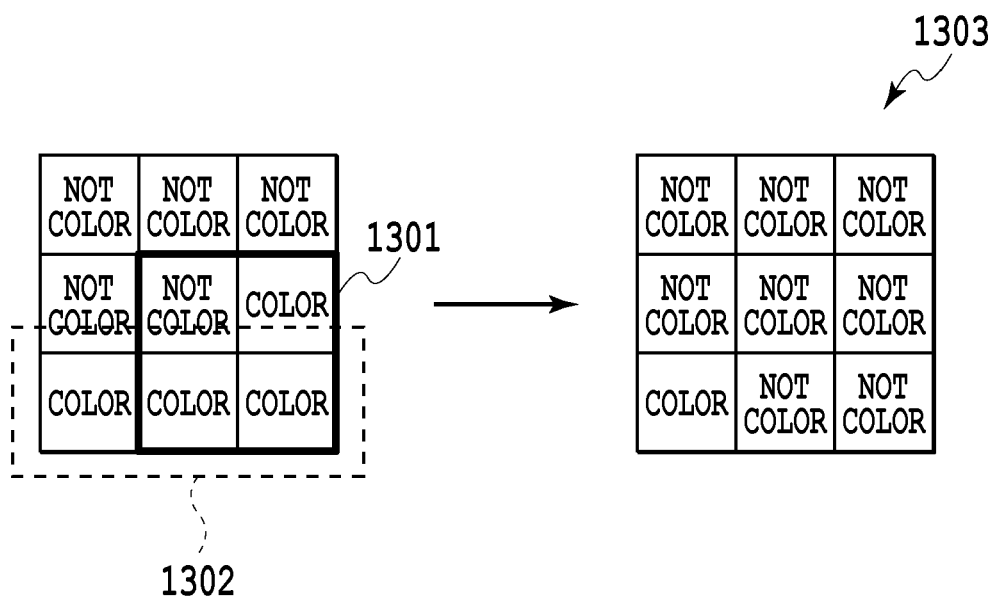
FIG. 13 is a view showing an example of color block counting in the embodiment.
Figure 14:
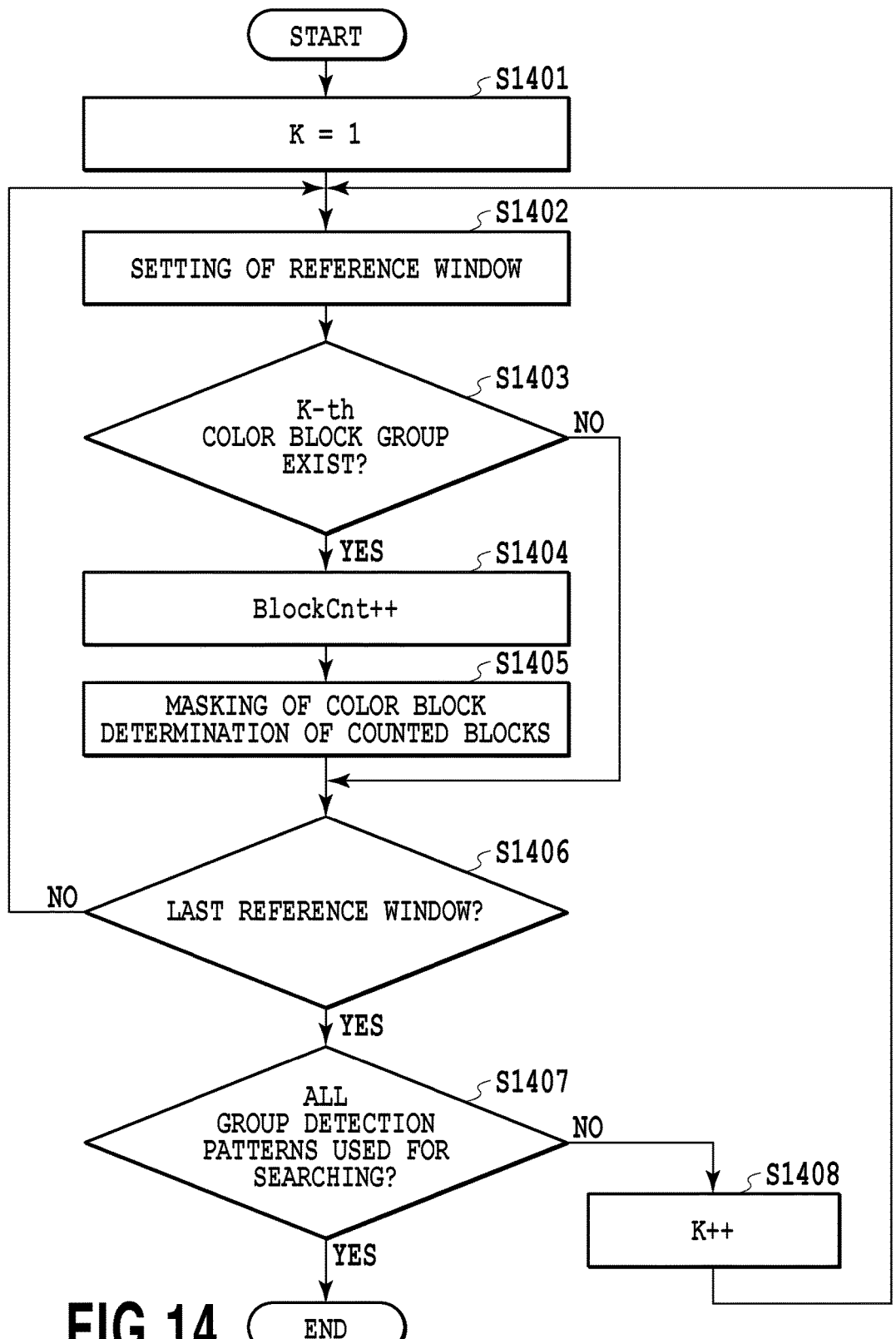
FIG. 14 is a flowchart showing a processing flow of color block group detection in the embodiment.

A more specific example of the color block group detection and color block count is described by using FIG. 13 and the flowchart of FIG. 14.

In step S1401, the color block counting unit 305 first sets a value "1" to "K" to detect color block groups matching the first color block group detection pattern. Note that K is a variable for identifying the color block group detection patterns from each other and is set to one of integers from 1 to 5. These values of K correspond respectively to the first to fifth color block group detection patterns shown in FIG. 12. In the following processing, handling of a block to be a target of the color block group detection processing is changed depending on the value of K.

In step S1402, the color block counting unit 305 sets a reference window in which color blocks in the scanned image are cut out in a size of a predetermined region. In this example, a reference window of at least 5×5 blocks is set to allow detection of color block groups by using the fourth and fifth color block group detection patterns. Then, the color block counting unit 305 counts the number of the color block groups in each of the reference windows.

In step S1403, the color block counting unit 305 searches the reference window set in step S1402 for a K-th color block group. In a case where step S1403 is executed for the first time, the color block counting unit 305 searches the reference window for a color block group which can be detected by using the first color block group detection pattern. In a case where there is a K-th color block group in the reference window, in step S1404, the color block counting unit 305 increments BlockCnt which is a color block group counter. Then, in step S1405, the color block counting unit 305 rewrites information on color blocks counted as a color block group to information indicating that the blocks are not color blocks. Specifically, the color block counting unit 305 rewrites information on color blocks in reference blocks matching the K-th color block group detection pattern to information indicating that the blocks are not color blocks. For example, assume a case where color blocks are arranged as shown in FIG. 13. Note that a region of 3×3 blocks is illustrated for simplification. In FIG. 13, there are a region 1301 matching the first color block group detection pattern and a region 1302 matching the second color block group detection pattern. In this stage, the color block counting unit 305 determines that the region 1301 is a color block group by using the first color block group detection pattern, and increments the color block group counter. Then, the color block counting unit 305 rewrites information on the blocks in the region matching the first color block group detection pattern to information indicating that the blocks are not color blocks, as in an example denoted by reference numeral 1303. For example, the color block counting unit 305 rewrites the information on the blocks in the region matching the first color block group detection pattern to information of monochrome blocks. In the next search processing, the color block counting unit 305 performs pattern matching by using the rewritten information. Redundant counting of color block groups for the same block can be thereby prevented in searching using the second color block group detection pattern.

Processing in steps S1403 to step S1405 is performed repeatedly for all of the blocks in the reference window. For example, in a case where there are multiple K-th color block groups in the reference window set in step S1402, the incrementing processing of step S1404 and the masking processing of step S1405 is performed for each of the multiple color block groups.

In step S1406, the color block counting unit 305 determines whether the searched reference window is the last window. Specifically, the color block counting unit 305 determines whether the detection of K-th color block groups has been performed for the entire document 204. In a case where the searched reference window is not the last window, the processing returns to step S1402, and a window position is set to the next reference position. In a case where the searched reference window is the last window, the processing proceeds to step S1407.

In step S1407, the color block counting unit 305 determines whether all of the patterns have been used to detect color block groups. Specifically, in this example, the color block counting unit 305 determines whether K is 5. In a case where all of the patterns have been used to detect color block groups, the color block counting operation is terminated. In a case where the color block counting unit 305 determines that not all of the patterns have been used to detect color block groups, the processing proceeds to step S1408, and K is set to K+1. Then, the processing returns to step S1402 and the window position is set to the first reference position.

By repeating the operations described above, color block patterns matching the first color block group detection pattern to the fifth color block group detection pattern are detected and the total number of the detected color block groups is recorded as BlockCnt. Moreover, it is possible to avoid redundant counting of color block groups already detected by using a pattern with a higher priority.

Although description is given of an example in which the first to fifth color block group detection patterns are used, the detection may be performed by using other patterns. Moreover, the number of patterns is not limited to five. In this case, a setting range of K, a setting range of the reference window, and the like can be changed as appropriate.

[Color/Monochrome Determination Unit]

Next, processing of the color/monochrome determination unit 306 is described. The color/monochrome determination unit 306 compares a threshold value Th4 and the color block group counter BlockCnt counted by the color block counting unit 305 with each other. In a case where the number of color block groups is greater than the threshold value Th4, the color/monochrome determination unit 306 determines that the document 204 is a color document.

In the embodiment, the color/monochrome determination is performed not based on simple consecutiveness of color blocks but based on a degree of matching between a pattern of color blocks and a predetermined pattern. Accordingly, it is possible to prevent a case where accuracy of the color/monochrome determination decreases depending on the shapes and arrangement of color contents and the like. Moreover, it is possible to improve accuracy of detecting small color contents such as letters of a small point size. Furthermore, it is possible to prevent a case of erroneously determining a document as a color document due to impurities included in a sheet of the document and color shift of a reading device.

Embodiment 2

In Embodiment 1, description is given of an example of preventing decrease in the accuracy of color/monochrome determination due to the shapes and arrangement of color contents and improving the accuracy of detecting small color contents. Moreover, description is given of an example of preventing such erroneous determination that a portion which is not actually a color portion in recycled paper or the like is determined to be a color portion. In Embodiment 2, description is given of color/monochrome determination processing performed on a document painted entirely with a low-density pattern. In general offset printing and printer output, an area coverage modulation method is used for density gradation. Examples of low-density patterns include a pattern 1501 formed of dots and a pattern 1502 formed of lines which are shown in FIG. 15. A document in which such dots and lines are printed in a chromatic color can be recognized as a color document in a normal viewing distance. In other words, a document in which a pattern like those in FIG. 15 is printed over the entire surface of a sheet in a chromatic color should be determined to be a color document. However, the method described in Embodiment 1 is a method of performing the color/monochrome determination based on the degree of aggregation of color blocks in a predetermined region in which color block groups exist. Accordingly, pixels (or blocks) in a portion painted with a pattern like those in FIG. 15 may not be determined to be color pixels.

The embodiment uses partially-modified configurations similar to the color block determination unit 304, the color block counting unit 305, and the color/monochrome determination unit 306 which are described in Embodiment 1. Description is given below of a method in which a document including a low-density painted portion of a chromatic color is determined to be a color document.

The density of chromatic color pixels in the low-density painted portion is usually lower than that in the aforementioned small color contents. Moreover, in the low-density painted portion, a large area is usually painted in a uniform density. Accordingly, setting the threshold value Th3 to a value smaller than that in Embodiment 1 allows the color block determination unit 304 to determine that the low-density painted portion is a color block. As described in Embodiment 1, the threshold value Th3 in the color block determination unit 304 is used to be compared with the number of chromatic color pixels in the target block. In a case where the number of chromatic color pixels in the target block is greater than the threshold value Th3, the color block determination unit 304 determines that the target block is a color block. Accordingly, in the embodiment, the threshold value Th3 is set to a value smaller than that of Embodiment 1 to make the color block determination unit 304 more likely to determine that the target block is a color block even in a smaller number of chromatic color pixels. In other words, the color block determination unit 304 is made more likely to determine that the target block is a color block, even in a case where the density of the chromatic color pixels is low.

In addition to this, the color block counting unit 305 may detect that a color block group is present in a case where eight or more color blocks exist in a window of 3×3 blocks, by using a color block group detection pattern. Since a large area is painted in a uniform density in the low-density painted portion, the color block counting unit 305 may detect that a color block group is present in a case where color blocks exist over a large area. Note that the window size is not limited to 3×3 and the window size and the threshold of the number of color blocks can be changed as appropriate depending on a painted region desired to be detected.

Then, the threshold value Th4 of the color/monochrome determination unit 306 is set to a value greater than that in Embodiment 1. As described in Embodiment 1, the threshold value Th4 of the color/monochrome determination unit 306 is used to be compared with the count number of the color block groups. The color/monochrome determination unit 306 determines that a read document is a color document in a case where the count number of color block groups is greater than the threshold value Th4. In the embodiment, first, the chromatic color pixels whose density is low are made more likely to be detected as color blocks as described above. Then, since the low-density painted portion spreads over a large area, the color block counting unit 305 counts color block groups in such a situation that the color blocks exist over a large area. In other words, in a document in which the low-density painted portion spreads over the entire surface, the number of color block groups to be counted should increase. Therefore, in the embodiment, the color/monochrome determination unit 306 performs color determination of the low-density painted portion with the threshold value Th4 being set to a value greater than that of Embodiment 1. Moreover, it is possible to prevent erroneous determination that a monochrome document is a color document due to erroneous detection of noises appearing in, for example, recycled paper.

Figure 16:
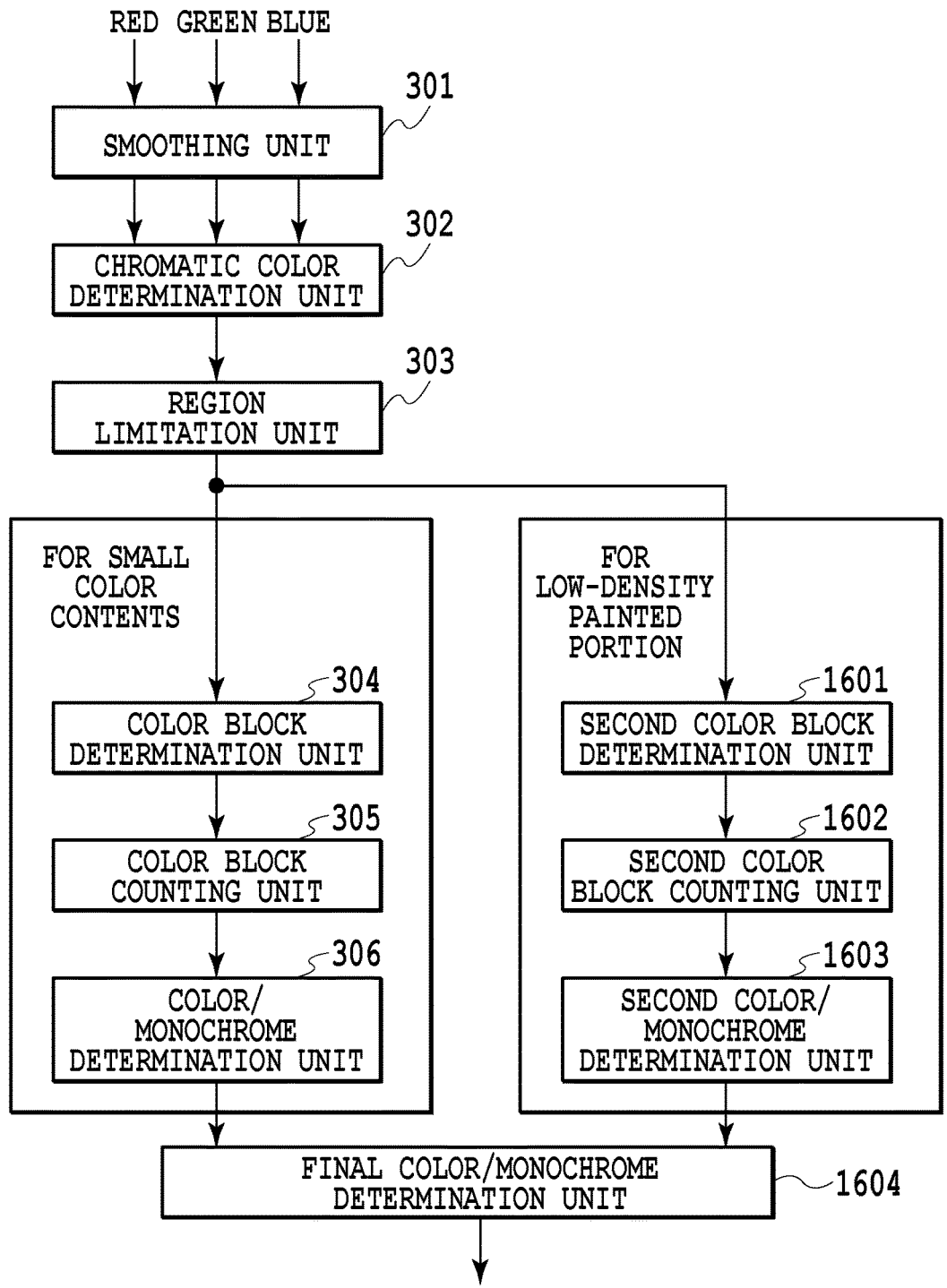
FIG. 16 is a processing block diagram of color/monochrome determination in Embodiment 2.

Next, by using FIG. 16, description is given of color/monochrome determination processing units in the image processing unit 102 for achieving both of color determination of small color contents like those described in Embodiment 1 and color determination of the aforementioned low-density painted portion. The same configurations as those in FIG. 3 are denoted by the same reference numerals and description thereof is omitted.

In FIG. 16, a second color block determination unit 1601, a second color block counting unit 1602, and a second color/monochrome determination unit 1603 for the color/monochrome determination of the low-density painted portion are provided parallel to the corresponding units in FIG. 3. Functions of these units may be the same as those of the color block determination unit 304, the color block counting unit 305, and the color/monochrome determination unit 306.

The threshold values, the detection pattern, and the reference window size of the second color block determination unit 1601, the second color block counting unit 1602, and the second color/monochrome determination unit 1603 are set to those for the low-density painted portion as described above. Then, data outputted from the region limitation unit 303 is inputted into both of the color block determination unit 304 for the small color contents and the second color block determination unit 1601 for the low-density painted portion and processing for the small color contents and processing for the low-density painted portion are performed in parallel.

In doing so, a set of the units for the small color contents and a set of the units for the low-density painted portion appropriately detect different target objects on the document 204 and output color/monochrome determination results, respectively. For example, in a case where the read document includes many small color contents, the color/monochrome determination unit 306 for the small color contents determines that the read document is a color document. Meanwhile, in a case where the read document includes the low-density painted portion over an entire surface thereof, the second color/monochrome determination unit 1603 for the low-density painted portion determines that the read document is a color document.

A final color/monochrome determination unit 1604 performs final color/monochrome determination based on the color/monochrome determination result for the small color contents and the color/monochrome determination result for the low-density painted portion. For example, the final color/monochrome determination unit 1604 performs final determination by performing OR operation on the color/monochrome determination results for the small color contents and the low-density painted portion. Alternatively, the final color/monochrome determination unit 1604 may perform the final determination by performing AND operation on the color/monochrome determination results for the small color contents and the low-density painted portion, or perform the final determination with the results being weighted. Moreover, although an example in which parallel processing is performed is described in Embodiment 2, repeated processing may be performed with the thresholds, the detection patterns, and the reference window size being changed. For example, in the configuration of FIG. 3 of Embodiment 1, there may be performed determination processing using the threshold values, the detection patterns, and the reference window size for the small color contents and then determination processing using the threshold values, the detection patterns, and the reference window size for the low-density painted portion.

Both of the color determination for the small color contents and the color determination for the low-density painted portion can be thus achieved by the method described above.

Other Embodiments

In the aforementioned embodiments, an example in which a document is read by a flatbed scanner is described. However, the configuration of the present invention is not limited by this example and a configuration in which an automatic document feeder (ADF) is used may be employed. In the ADF, a document is conveyed by being held between the rollers. False color may occur due to slight shaking of the document in passing of the document to and from the rollers during the conveyance. Accordingly, in a case of using the ADF, color/monochrome determination invalid regions suitable for the ADF may be set.

Moreover, in the aforementioned embodiments, description is given of an example in which one photosensitive drum is provided and toners of various colors are developed on the photosensitive drum. However, the aforementioned color/monochrome determination processing can be performed also in a printing apparatus in which a photosensitive drum is provided for each color.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In the present invention, appropriate color determination can be performed on a document.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-120786, filed Jun. 11, 2014, which is hereby incorporated by reference wherein in its entirety.

What is claimed is:

1. An image processing apparatus comprising:
a controller which executes instructions stored in a memory or a circuitry,
wherein the controller or the circuitry obtains an image including a plurality of blocks from a color image sensor, each of the blocks including a plurality of pixels,
wherein the controller or the circuitry determines whether each of the blocks is a color block or a monochrome block,
wherein the controller or the circuitry determines whether color blocks are arranged consecutively greater than a first predetermined number in the image,
wherein the controller or the circuitry determines whether the number of color blocks is greater than a third predetermined number in a region including a second predetermined number of blocks in the image, and
wherein the controller or the circuitry determines whether the image is a color image or a monochrome image based on a determination result of determining whether color blocks are arranged consecutively greater than the first predetermined number in the image and a determination result of determining whether the number of color blocks is greater than the third predetermined number in the region including the second predetermined number of blocks in the images.

2. The image processing apparatus according to claim 1, wherein the controller or the circuitry determines that a block is a color block in a case where the number of chromatic color pixels in the block is greater than a fourth threshold value.

3. The image processing apparatus according to claim 1, wherein the controller or the circuitry
compares an arrangement of the determination result of the color block and the monochrome block and a predetermined pattern including at least color, and wherein the controller or the circuitry determines whether the image is a color image or a monochrome image based on the determination result of determining whether color blocks are arranged consecutively greater than the first predetermined number in the image, the determination result of determining whether the number of color blocks is greater than the third predetermined number in the region including the second predetermined number of blocks in the image and the comparison result.

4. The image processing apparatus according to claim 1, wherein the first predetermined number is three.

5. The image processing apparatus according to claim 1, wherein the second predetermined number is four and the third predetermined number is three.

6. The image processing apparatus according to claim 1, wherein, in determining whether each of the blocks is a color block or a monochrome block, the controller or the circuitry determines that blocks in at least one of a leading edge region and a trailing edge region of the image in a sub-scanning direction are monochrome blocks.

7. The image processing apparatus according to claim 1, wherein, in determining whether each of the blocks is a color block or a monochrome block, the controller or the circuitry performs the determination on each of blocks shifted from a target block, and determines that the target block is a color block in a case where the number of chromatic color pixels is greater than a fourth threshold value in any of the blocks.

8. The image processing apparatus according to claim 3, wherein the controller or the circuitry
further counts up the number of matches between the arrangement of the blocks determined to be color blocks and the blocks determined to be monochrome blocks with the predetermined pattern formed arrangement of color and monochrome, and
wherein the controller or the circuitry determines that the image is a color image in a case where the counted-up number exceeds a second threshold value.

9. The image processing apparatus according to claim 8, the controller or the circuitry
further increments the number in a case where the arrangement of the blocks determined to be color blocks and the blocks determined to be monochrome blocks matches any one of a plurality of predetermined pattern formed arrangements.

10. The image processing apparatus according to claim 9, the controller or the circuitry
further performs comparison by using the plurality of predetermined pattern formed arrangements one by one, changes the matching blocks to monochrome blocks in a case where the number is incremented, and performs comparison with remaining arrangements by using the changed blocks.

11. An image processing method to be executed in an image processing apparatus, the method comprising:
an obtaining step of obtaining an image including a plurality of blocks from a color image sensor, each of the blocks including a plurality of pixels;
a first determination step of determining whether each of the blocks is a color block or a monochrome block;
a second determination step of determining whether color blocks are arranged consecutively greater than a first predetermined number in the image;
a third determination step of determining whether the number of color blocks is greater than a third predetermined number in a region including a second predetermined number of blocks in the image; and
a fourth determination step of determining whether the image is a color image or a monochrome image based on a determination result of the second determination step and a determination result of the third determination step.

12. The image processing method according to claim 11, wherein the first determination step determines that a block is a color block in a case where the number of chromatic color pixels in the block is greater than a fourth threshold value.

13. The image processing method according to claim 11, further comprising:
an comparing step of comparing an arrangement of a determination result of the first determination step and a predetermined pattern including at least color; and
a fifth determining step of determining whether the image is a color image or a monochrome image based on the determination result of the second determination step, a determination result and the comparison result.

14. The image processing method according to claim 11, wherein the first predetermined number is three.

15. The image processing method according to claim 11, wherein the second predetermined number is four and the third predetermined number is three.

16. The image processing method according to claim 11, wherein the first determination step determines that blocks in at least one of a leading edge region and a trailing edge region of the image in a sub-scanning direction are monochrome blocks.

17. The image processing method according to claim 11, wherein the first determination step performs the determination on each of blocks shifted from a target block, and determines that the target block is a color block in a case where the number of chromatic color pixels is greater than a fourth threshold value in any of the blocks.

18. The image processing method according to claim 13, further comprising:
a counting step of counting up the number of matches between the arrangement of the blocks determined to be color blocks and the blocks determined to be monochrome blocks with the predetermined pattern formed arrangement of color and monochrome, and
a sixth determination step of determining that the image is a color image in a case where the counted-up number exceeds a second threshold value.

19. The image processing method according to claim 18, further comprising:
an incrementing step of incrementing the number in a case where the arrangement of the blocks determined to be color blocks and the blocks determined to be monochrome blocks matches any one of a plurality of predetermined pattern formed arrangements.

20. The image processing method according to claim 19, further comprising:
a performing step of performing comparison by using the plurality of predetermined pattern formed arrangements one by one, changes the matching blocks to monochrome blocks in a case where the number is incremented, and performs comparison with remaining arrangements by using the changed blocks.

21. A non-transitory computer readable storage medium storing a program which causes an image processing apparatus to perform the image processing method comprising:
an obtaining step of obtaining an image including a plurality of blocks from a color image sensor, each of the blocks including a plurality of pixels;

a first determination step of determining whether each of the blocks is a color block or a monochrome block;

a second determination step of determining whether color blocks are arranged consecutively greater than a first predetermined number in the image;

a third determination step of determining whether the number of the color blocks is greater than a third predetermined number in a region including a second predetermined number of blocks in the image;

a fourth determination step of determining whether the image is a color image or a monochrome image based on a determination result of the second determination step and a determination result of the third determination step.

* * * * *